US011500102B1

(12) United States Patent
Amzajerdian et al.

(10) Patent No.: US 11,500,102 B1
(45) Date of Patent: Nov. 15, 2022

(54) LIDAR IMAGING WITH VELOCITY ACQUISITION

(71) Applicant: UNITED STATES OF AMERICA AS REPRESENTED BY THE ADMINISTRATOR OF NASA, Washington, DC (US)

(72) Inventors: Farzin Amzajerdian, Yorktown, VA (US); Diego F. Pierrottet, Poquoson, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 863 days.

(21) Appl. No.: 16/404,137

(22) Filed: May 6, 2019

Related U.S. Application Data

(60) Provisional application No. 62/666,722, filed on May 4, 2018.

(51) Int. Cl.
*G01S 17/89* (2020.01)
*G01S 17/58* (2006.01)
*G01S 17/42* (2006.01)
*G01S 17/931* (2020.01)

(52) U.S. Cl.
CPC .............. *G01S 17/89* (2013.01); *G01S 17/42* (2013.01); *G01S 17/58* (2013.01); *G01S 17/931* (2020.01)

(58) Field of Classification Search
CPC .. G05D 1/0251; G05D 1/0257; G01S 7/4804; G01S 17/86; G01S 17/894
See application file for complete search history.

(56) References Cited

U.S. PATENT DOCUMENTS

| | | | |
|---|---|---|---|
| 7,838,808 B1* | 11/2010 | Ake | G01J 1/44 250/214 R |
| 8,837,654 B2 | 11/2014 | Pierrottet et al. | |
| 9,007,569 B2 | 4/2015 | Amzajerdian et al. | |
| 9,383,753 B1* | 7/2016 | Templeton | G01S 17/42 |

(Continued)

OTHER PUBLICATIONS

Amzajerdian et al.., "Demonstration of Coherent Doppler Lidar for Navigation in GPS-Denied Environments," Laser Radar Technology and Applications XXII, Proc. of SPIE, vol. 10191, 1019102 (May 5, 2017) 8 pages., edited Turner et al., doi 10.1117/12. 2266972.

(Continued)

*Primary Examiner* — Mirza F Alam
(74) *Attorney, Agent, or Firm* — Shawn P. Gorman; Jonathan B Soike; Helen M. Galls

(57) ABSTRACT

Aspects of the present disclosure are directed to imaging an environment and providing velocity characteristics of one or more objects in the imaged environment. As may be implemented in accordance with one or more embodiments, objects in a local environment are scanned with laser light, and reflections of the scanned laser light from the objects are received and processed to generate a 3D image of the local environment. Distance and velocity of each object is provided or detected based on a frequency delay and frequency shift of one or more reflections of the scanned laser light from the object. For instance, the 3D image may provide relative position of an object and indicate velocity of the object, which may be ascertained based on a frequency shift.

20 Claims, 4 Drawing Sheets

(56) References Cited

U.S. PATENT DOCUMENTS

| | | | |
|---|---|---|---|
| 2010/0121577 A1* | 5/2010 | Zhang | G01S 17/931 |
| | | | 382/104 |
| 2019/0033879 A1* | 1/2019 | Templeton | G05D 1/024 |
| 2020/0292709 A1* | 9/2020 | Eshel | G01S 7/497 |

OTHER PUBLICATIONS

Crouch, "Advantages of 3D Imaging Coherent Lidar for Autonomous Driving Applications," 19th Coherent Laser Radar Conference, Jun. 18-21, 2018, pp. 104.

Davies, "A New Doppler Lidar Solves Self-Driving Cars' Need for Speed," Wired.com/category/transportation, Sep. 5, 2018), 5 pages., https://www.wired.com/story/blackmore-doppler-lidar-self-driving-cars.

Kim et al., "Wide-angle, nonmechanical beam steering using thin liquid crystal polarization gratings," Advanced Wavefront Control: Methods, Devices, and Applications VI, edited Gonglewski et al., Proc. of SPIE, Aug. 26, 2008, pp. 709302-1-709302-12., vol. 7093, http://proceedings.spiedigitallibrary.org, downloaded on Jan. 27, 2016, doi 10.1117/12.795752.

Mitsubishi Electric Corp., "Doppler Lidar Systems," Product information, 1 page, www.mitsubishietectric.com/bu/lidar/lidar/principle/index.html, downloaded Apr. 3, 2019.

U.S. Appl. No. 15/932,639, filed Mar. 28, 2018 for "NavigationSystem for GPS Denied Environments".

\* cited by examiner

LIDAR IMAGING WITH VELOCITY ACQUISITION

CROSS-REFERENCE TO RELATED PATENT APPLICATION(S)

This patent application claims the benefit of and priority to U.S. Provisional Patent Application Serial No. 62/666,722, filed on May 4, 2018, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

OVERVIEW

Various vehicle navigation systems may utilize information concerning an environment in which the vehicle operates for a variety of operations. For instance, collision avoidance systems may benefit from information characterizing the relative position and motion of other vehicles or objects in an environment through which a vehicle travels. More complex assisted-driving or autonomous driving systems may need to ascertain characteristics of an environment in which the vehicle operates, in order to operate safely. Demand for such systems is becoming more widespread.

While useful, vehicular navigation, collision avoidance and autonomous driving systems can be challenging to implement. For instance, ascertaining the position and movement of objects in an environment can be challenging. In particular, it can be challenging to provide information concerning an environment in a manner that would otherwise be ascertainable by a human operating a vehicle and observing the environment. These and other issues can be challenging to the design, manufacture and implementation of apparatuses, systems and methods in which environmental conditions are desirably ascertained.

SUMMARY

The present disclosure is directed to various apparatuses, systems and methods involving a LIDAR based approach, in which a 3D environment is characterized via images while also providing velocity data pertaining to objects in the 3D environment.

One embodiment is directed to an apparatus including a laser transmitter, a laser receiver and processing circuitry. The laser transmitter is configured and arranged to scan three-dimensional (3D) objects in a local environment with laser light, and the laser receiver is configured and arranged to receive reflections of the scanned laser light from the 3D objects. The processing circuitry is configured and arranged with the laser transmitter and the laser receiver to generate a 3D image of the local environment including the 3D objects using the reflections of the scanned laser light, and to provide for each of the 3D objects, distance and velocity of the 3D object relative to the laser transmitter based on a frequency delay and frequency shift of one of the reflections of the scanned laser light from the object, relative to the scanned laser light.

Another embodiment is directed to a vehicle navigation apparatus including a laser source, laser transmitter circuitry, laser receiver circuitry, and imaging circuitry. The laser source is configured to generate a frequency-modulated continuous waveform (FMCW) laser signal, and the laser transmitter circuitry is configured to amplify and scan the FMCW laser signal across a local environment. The laser receiver circuitry is configured to receive the FMCW laser signal from the laser source, to receive reflections of the scanned laser light from objects in the local environment, and to demodulate the received reflections with the FMCW laser signal. The imaging circuitry is configured to generate a 3D image of the local environment including the objects, by using the demodulated reflections of the scanned laser light to depict the objects in their respective locations in the 3D image and being indicative of velocity of the object relative to the laser transmitter. In some implementations, the imaging circuitry is configured to depict each of the objects with the object's velocity based upon a frequency shift of a reflection of the scanned laser light from the object.

Another embodiment is directed to a method as follows. Three-dimensional (3D) objects in a local environment are scanned with laser light, reflections of the scanned laser light are received from the 3D objects, and a 3D image of the local environment including the 3D objects is generated using the reflections of the scanned laser light. Distance and velocity of each 3D object is provided based on a frequency delay and frequency shift of one of the reflections of the scanned laser light from the 3D object, relative to the scanned laser light.

These and other features, advantages, and objects of the present invention will be further understood and appreciated by those skilled in the art by reference to the following specification, claims, and appended drawings.

DETAILED DESCRIPTION

Figure 1A:
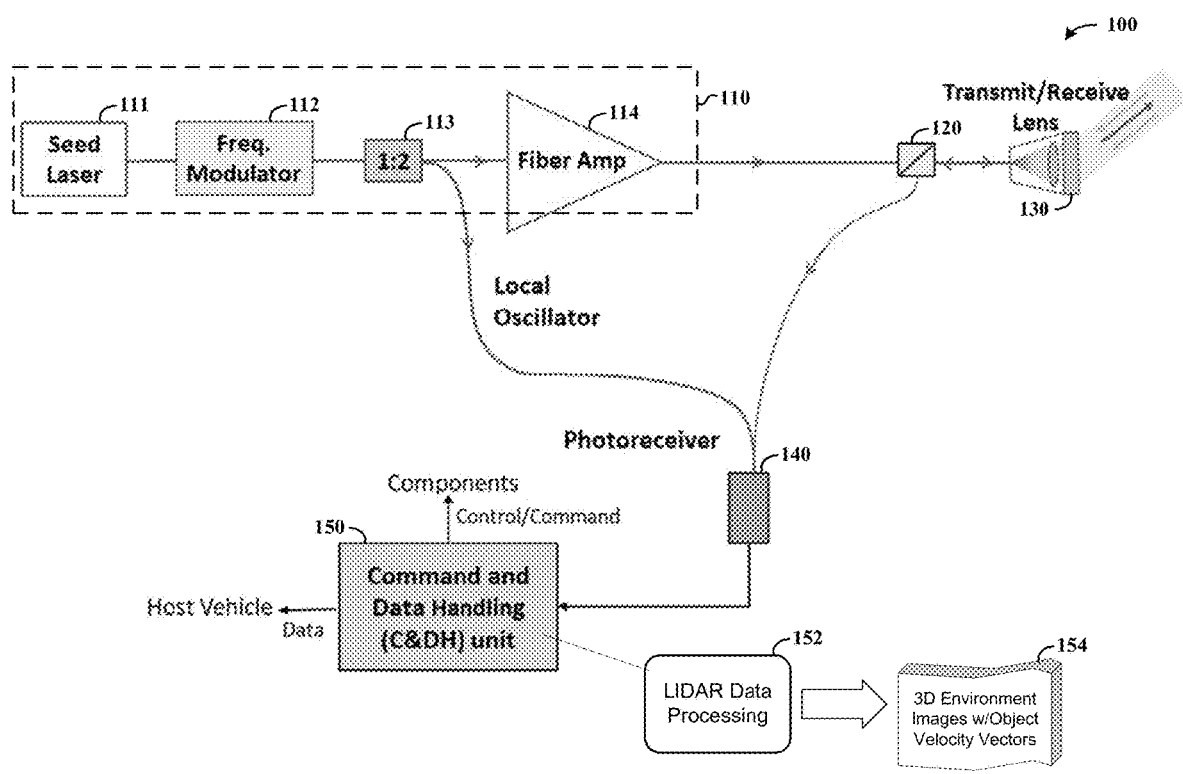
FIG. 1A shows an apparatus, as may be implemented in accordance with one or more embodiments.

For purposes of description herein, the terms "upper," "lower," "right," "left," "rear," "front," "vertical," "horizontal," and derivatives thereof shall relate to the embodiment as oriented in FIG. 1. However, it is to be understood that the described embodiments may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Various aspects of the present disclosure are directed to laser-based 3D imaging with velocity acquisition for objects in a local environment being imaged. In particular embodiments, a laser scanning apparatus ascertains the three-dimensional position of objects in the local environment, along with each object's velocity relative to the laser scanning apparatus, by scanning laser light and detecting reflections thereof. This facilitates the generation of a 3D image showing all objects and their velocity within the local environment. The same reflections can be used to generate the 3D image as well, therein providing both an accurate 3D image of the environment and velocity characteristics of objects in the 3D image. Such approaches can be implemented in moving vehicles and used to ascertain the location and movement of various objects in the local environment as the vehicles travel.

In particular embodiments, reflections of scanned laser light are utilized along with a source of the scanned laser light, to ascertain delays in the reflections as well as frequency shifts thereof. This information concerning respective ones of the reflections from each object can be utilized to ascertain position and velocity of the object, while reflections from all the objects can be utilized to generate a related 3D image (or otherwise provide data indicative of the 3D environment). In some implementations, 3D velocity (Doppler) images as well as 3D range images are obtained, which can be utilized to provide an overall 3D image of the environment.

In a more particular embodiment, a navigation Doppler LIDAR (NDL) apparatus is utilized to characterize objects and their motion in a 3D environment, which may be utilized for driverless (autonomous) cars. The NDL apparatus scans the 3D environment with laser light and measures the range and velocity of objects in the environment, relative to a vehicle in which the NDL is deployed, by processing the frequency of reflections of the scanned laser light with the source thereof. By scanning its laser beam, this LIDAR can provide a 3-D image of the surrounding plus ascertain the velocity of moving objects within its field of range, which may read up to hundreds of meters from the vehicle. Accordingly, 3D range and Doppler (velocity) images of structures, road boundaries, road signs, trees, other vehicles, and pedestrians may be ascertained.

In particular embodiments, a LIDAR sensor uses a frequency-modulated continuous wave (FMCW) technique and optical homodyne detection to obtain both range and velocity (speed and direction of motion) data. A target range is determined by measuring the delay in the laser waveform return, and its velocity is obtained by measuring the Doppler shift in laser frequency. In this LIDAR sensor, the reflected laser light is collected by a lens and focused onto a detector. The detected light is mixed with source light (as a local oscillator signal), and used to produce a signal characterizing a difference. The electrical signal produced by the detector is processed in the frequency domain to extract both range and velocity of the objects. The laser operates, for example, at 1.5 micron wavelength regime in which laser intensity limits for eye-safety are significantly higher than shorter infrared and visible wavelength regions. Thus, sufficient laser power can be used to achieve desired operational range without risking the safety of humans and animals.

The laser light may be scanned using a variety of approaches, ranging from mechanical mirrors or other mechanical optics, to non-mechanical optics. In particular embodiments, a non-mechanical beam steering device is employed to scan a laser beam for generating 3D images of a local environment, and to ascertain the velocity of other objects in the local environment, in a manner as characterized herein. The non-mechanical beam steering may be achieved by using a programmable multi-layered liquid crystal film that can point the laser beam towards a specified direction on command, and that may otherwise scan the laser light in a 3D environment. It has been recognized/discovered that, utilizing such a non-mechanical beam-steering approach with vehicles that are moving, mitigates the effects of vibration or other movement of the vehicle as would affect mechanical beam steering approaches.

A variety of approaches to scanning laser light may be used to suit particular applications. For general information regarding beam steering, and for specific information concerning a manner or manners in which to scan laser light using a liquid crystal scanner, reference may be made to Kim et al., "Wide-angle, non-mechanical beam steering using thin liquid crystal polarization gratings," Proc. SPIE 7093, Advanced Wavefront Control: Methods, Devices, and Applications VI, 709302 (26 Aug. 2008), which is fully incorporated herein by reference.

One or more embodiments are directed to ascertaining a 3D environment for use in aviation or space travel. Laser beams are directed or scanned at different locations relative to the environment. Range and velocity are ascertained using a frequency modulated continuous wave (FMCW) technique. For instance, three line-of-sight (LOS) measurements can be taken and combined to determine three components of a vehicle velocity vector and its altitude relative to ground or another object in the environment. Accordingly, various embodiments are directed to implementations in this regard, including the various experimental-type implementations characterized in the above-referenced provisional patent application to which the instant application claims priority. For instance, various vehicle-based approaches, including autonomous vehicle-based approaches, may utilize one or more implementations as characterized in FIGS. 1 and 3 for ascertaining position and environmental conditions.

Further, various approaches to processing LIDAR data for obtaining frequency shift and signal delay may be implemented in a manner characterized in the aforementioned provisional patent application, and as may further utilize approaches characterized in the references cited therein which are also fully incorporated herein by reference. For instance, an NDL can be implemented as a navigation sensor providing highly precise, surface-relative, vector velocity and altitude data that uses an FMCW technique. The NDL can be a viable replacement of or augmentation to radar sensors, may provide over an order of magnitude higher precision velocity and altitude measurements, and may do so while mitigating ambiguities or target clutter with lower mass, size, and power, relative to radar sensors. In some implementations, such an NDL is utilized in terrestrial aircraft applications that utilize velocity and altitude data relative to local ground, and as may operate in GPS-denied environments.

In accordance with one or more embodiments, an apparatus includes a laser transmitter, a laser receiver and processing circuitry, which may be implemented for vehicle navigation. The laser transmitter scans objects in a local environment with laser light, and reflections of the scanned laser light from the objects are received at the laser receiver. The scanning may, for example, use a non-mechanical scanner (e.g., without necessarily using mirrors), such as a programmable multi-layered liquid crystal beam steering scanner, to direct the laser light across a three-dimensional area in the local environment. The processing circuitry generates a 3D image of the local environment including the objects using the reflections of the scanned laser light, and provides distance and velocity of each of the objects relative to the laser transmitter, based on a frequency delay and frequency shift of one of the reflections of the scanned laser light from the object.

In some implementations, the processing circuitry operates with the laser transmitter and receiver to indicate the velocity of each of the objects in the generated 3D image. For instance, a number or symbol may be associated with the object in the 3D image, or the color of the object in the generated 3D image may be set based upon the frequency shift of the reflection from the object. As such, direction and speed of movement of the object relative to the transmitted laser light can be depicted. In certain implementations, respective ones of the reflections from the same object are used to detect velocity of the object in respective positions as the object moves, and the detected velocity in each of the respective positions is used to indicate a direction of movement of the object and speed of the object along the direction of movement. Such an approach can also be used to assess acceleration and deceleration of objects in the local environment, based on the speed of the object in each of the respective positions.

In various implementations, the apparatus also includes a laser source configured with the laser transmitter to generate the laser light as a frequency-modulated continuous waveform (FMCW) laser signal. The processing circuitry mixes the FMCW laser signal with reflections of the scanned laser light, for providing the distance and relative velocity of the object. For instance, this may involve demodulating the (amplified) reflected FMCW laser signals. Range and velocity images can be generated by combining the distance and relative velocity of the objects as the laser light scans the local environment, in which the velocity images indicate velocity as one or more of a color, a number, and a symbol (e.g., +or –) associated with the velocity.

The processing circuitry operates in a variety of manners, to suit particular applications. In some embodiments, the laser receiver processes the reflections of the scanned laser light with an optical oscillator signal used to generate the laser light scanned by the laser transmitter. The laser receiver may demodulate, or otherwise downconvert the frequency of the reflections of the scanned laser light by mixing the reflections with the optical oscillator signal used to generate the laser light scanned by the laser transmitter. Range and velocity images may be generated via the processing circuitry based on distance and relative velocity of respective ones of the objects as the laser transmitter scans the scene with the laser light. The velocity of the objects may, for example, be provided in response to increases or decreases in Doppler shift of respective ones of the reflections from the object.

In a more particular embodiment, the apparatus further includes a seeding laser source configured to generate a seeding laser output, a waveform generator configured and arranged with the seeding laser source to generate a laser signal by modulating the seeding laser output, a laser amplifier, and a beam splitter to direct a portion of the laser signal to the laser receiver, and to direct another portion of the laser signal to the laser amplifier. The laser transmitter is then coupled to receive an amplified version of the laser signal output by the laser amplifier, and scans the 3D objects in the local environment with the amplified version of the laser signal.

Another embodiment is directed to a method as follows. Objects in a local environment are scanned with laser light, such as by using a multi-layered liquid crystal beam steering scanner. Reflections of the scanned laser light are received from the objects, and a 3D image of the local environment including the objects is generated using the reflections of the scanned laser light. Distance and velocity of each object is provided based on a frequency delay and frequency shift of one of the reflections of the scanned laser light from the 3D object, relative to the scanned laser light.

The laser light may, for example, be generated as a frequency-modulated continuous waveform (FMCW) laser signal and amplified, prior to scanning. The 3D image is then generated using part of the FMCW laser signal, prior to or after amplification, to demodulate the reflections of the scanned laser light.

In some embodiments, the distance and velocity of the objects are provided by depicting the objects in a position in an image of the local environment and with each object depicted with an image characterization that is indicative of the object's velocity. For instance, each object may be depicted with a number, symbol and/or color that is based upon a frequency shift of the reflection from the object used to generate the image, to indicate a direction and speed of movement of the object. In some implementations, respective ones of the reflections from the same object are utilized to detect velocity of the object in respective positions as the object moves. The detected velocity in each of the respective positions is used to indicate a direction of movement of the object and speed of the object along the direction of movement.

Turning now to the figures, FIG. 1A shows an apparatus 100, as may be implemented in accordance with one or more embodiments. The apparatus 100 includes a laser source 110, a transmit/receive switch 120, and a transmit/receive scanner 130 that scans light from the laser source to a local environment and receives reflections thereof. The transmit/receive switch 120 operates to pass source light from the laser to the transmit/receive scanner 130, and passes reflections of the scanned light to a photoreceiver 140, which is also coupled to receive the source light as a local oscillator signal. Accordingly an intermediate frequency signal can be produced via mixing the local oscillator signal with the reflections, resulting in a signal characterizing differences in the reflections relative to the source light.

A command and data handling unit (CDH) 150 (e.g., processing circuitry) processes an output from the photoreceiver 140 and ascertains the location and velocity of 3D objects in the local environment therefrom, by processing LIDAR data at block 152 and generating an output 154 indicative of images of the 3D environment with velocity vectors for the objects depicted therein. In a particular implementation, the CDH 150 generates an output for a host vehicle in which the apparatus 100 is employed, and provides data indicative of the 3D environment, objects therein and directional velocity of the objects.

In some embodiments, a computing unit (not shown in FIG. 1) connected the CDH 150 may further be utilized to generate control/command outputs to certain components in response to the positions and/or velocity vectors of the objects matching a set of criteria. For example, in some embodiments, the computing unit may include a data storage configured with one or more sets of criteria for which the computing unit is configured to trigger or perform one or more actions. In some implementations, data in the data storage may specify a respective set of actions to be performed for each respective set of criteria, if satisfied by the positions and/or velocity vectors of the objects. As an illustrative example, in some embodiments, the computing unit may be configured to evaluate velocity vectors of the objects to identify potential collision scenarios and trigger evasive action by an automated driver system or automated pilot system connected to the computing unit c (e.g., change in velocity in direction, etc) in order to avoid or mitigate a collision. As another example, the computing unit may be configured to recognize potential collusion scenarios and trigger an audible alert to a driver if such a collision scenario is detected. For instance, the computing unit may be configured to provide an audible warning when a signaled lane change may collide with an automobile approaching quickly from behind even though the adjacent lane is currently clear. As another example, the computing unit may be configured to provide direction to provide control commands to an automated driver system to provide computer assisted merging onto a highway.

In some embodiments, the computing unit connected to CDH 150 may be configured to generate the control/command outputs (e.g., to trigger various actions) based on data from one or more sensors in addition to or in lieu of the determined positions and/or velocity vectors. For instance, the computing unit may utilize data from various sensors including but not limited to, road condition sensors (e.g., antilock braking and traction sensors), velocity sensors, global positioning data, weather sensors (e.g., temperature and/or humidity), and/or repository data (e.g., from the internet), etc. The sets of criteria used by the computing unit may utilize various different subsets of available sensor data to trigger different actions.

In some implementations, the computing unit connected to the CDH 150 may include an machine learning unit (not shown in FIG. 1) configured to supplement or adjust the sets of criteria used to control/command outputs (e.g., to trigger various actions). The machine learning unit may adjust different ones of the sets of criteria using one or more machine learning techniques including, but not limited to, neural networks, genetic algorithms, support vector machines, k-means, kernel regression, and/or discriminant analysis, for example. In some embodiments, machine learning processing and/or adjustment may be performed on the fly in real time while the vehicle is in use. Additionally or alternatively, machine learning may process data harvested from vehicle operation and update the sets of criteria when the vehicle is not in use. In some embodiments, machine learning processing may be performed directly by the computing unit. Additionally or alternatively, the computing unit may upload harvested data to a centralized or cloud-based computer for machine learning processing. For instance, an automobile company may harvest and upload data from all like vehicles to a central location for machine learning processing and/or big data analysis. Updates to the sets of criteria resulting from the centralized processing may be pushed back down to the computing unit for update to the locally stored sets of criteria.

The laser source 110 can be implemented in a variety of manners. In some embodiments, the laser source 110 is implemented using a seed laser 111, a frequency modulator 112 that modulates the output of the seed laser, and a beam splitter 113 that splits the frequency-modulated output of the seed laser. A fiber amplifier 114 amplifies one of the split outputs of the beam splitter 113 for generating the output of the laser source 110. The other split output of the beam splitter 113 is provided to the photoreceiver 140, and can be used/mixed with the reflections for characterizing distance to scanned objects in the local environment.

In some implementations, the apparatus 100 is implemented for navigation with an NDL. The laser source 110 generates a FMCW laser output and optical homodyne detection is used to obtain both range and velocity data from reflections of the laser output. The laser source 110 is a low power, single frequency laser operating at a wavelength of 1.55 micron, commonly referred to as an eye-safe wavelength, as a master oscillator. The frequency of this laser is modulated linearly with time. A portion of the laser power is amplified to be transmitted and the rest is used as the local oscillator (LO) for optical homodyne detection, via photoreceiver 140. Laser beams are scanned and reflections of the scanned beams are received and digitized, then processed using a Fourier Transform algorithm (e.g., Fast Fourier Transform (FFT)) to extract line-of-sight (LOS) velocity and range data. The platform vector velocity is determined from the LOS velocities measured along the laser beams, such as by using a priori pointing data. For instance, where three simultaneous LOS range measurements are taken, altitude can be determined relative to local ground without the need for attitude angle data from a separate sensor.

Figure 1B:
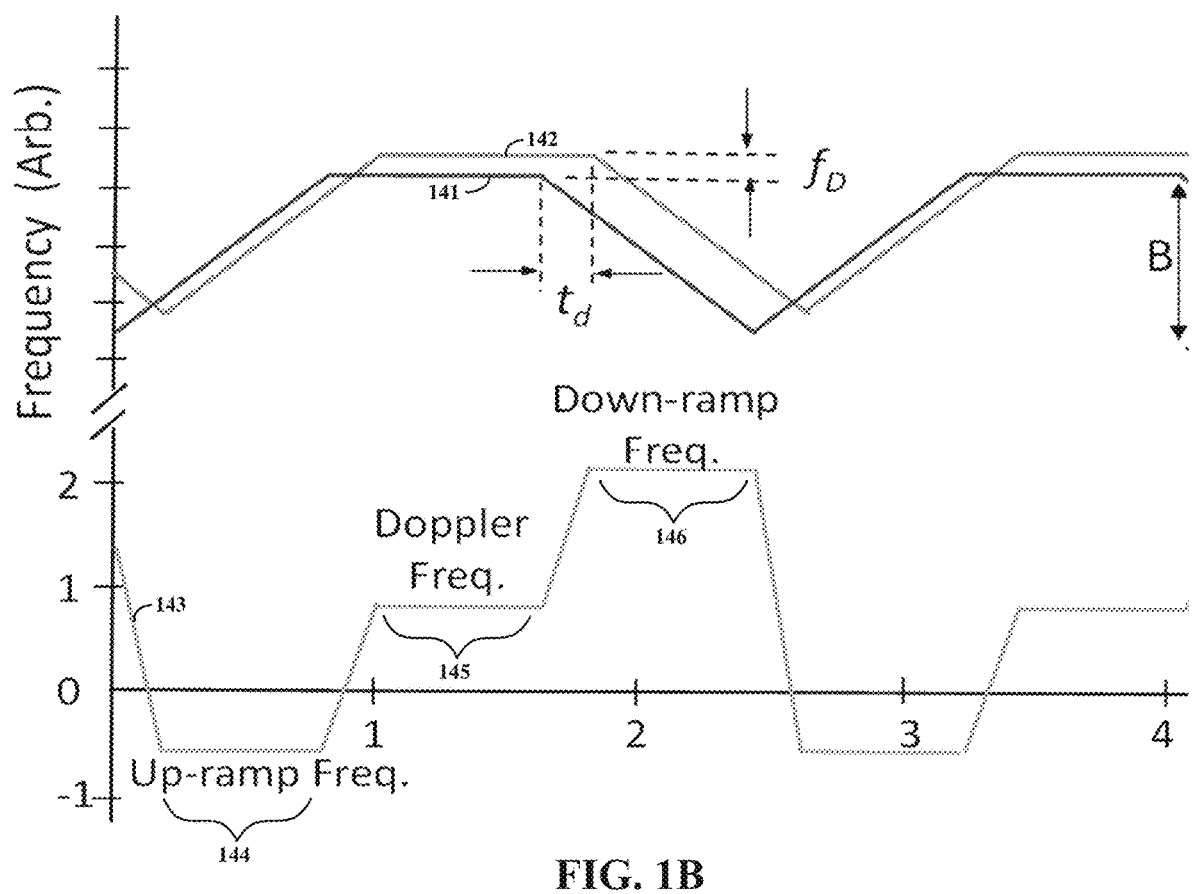
FIG. 1B shows respective plots of transmitted laser light and delayed, frequency-shifted reflections thereof, as may be processed via the apparatus shown in FIG. 1A.

FIG. 1B shows representative waveforms as may be deployed in an FMCW lidar, as may be processed via the apparatus shown in FIG. 1A. Plot 141 shows an NDL waveform, and plot 142 shows a reflection thereof, having three segments: an up-ramp chirp 144, constant frequency 145, and a down-ramp chirp 146. Plot 143 depicts the respective frequencies at each of these segments. A constant frequency segment 145 produces a Doppler velocity that can be used for eliminating data dropouts when either the up-ramp or down-ramp frequency is very close to zero, and allows for eliminating the measurement ambiguities that may arise in certain scenarios. Plot 142 is shifted in time by the shown delay $t_d$, which is indicative of distance. Plot 142 is also shifted in frequency by the shown frequency shift $f_d$, which is indicative of velocity (e.g., as a Doppler shift).

Figure 2:
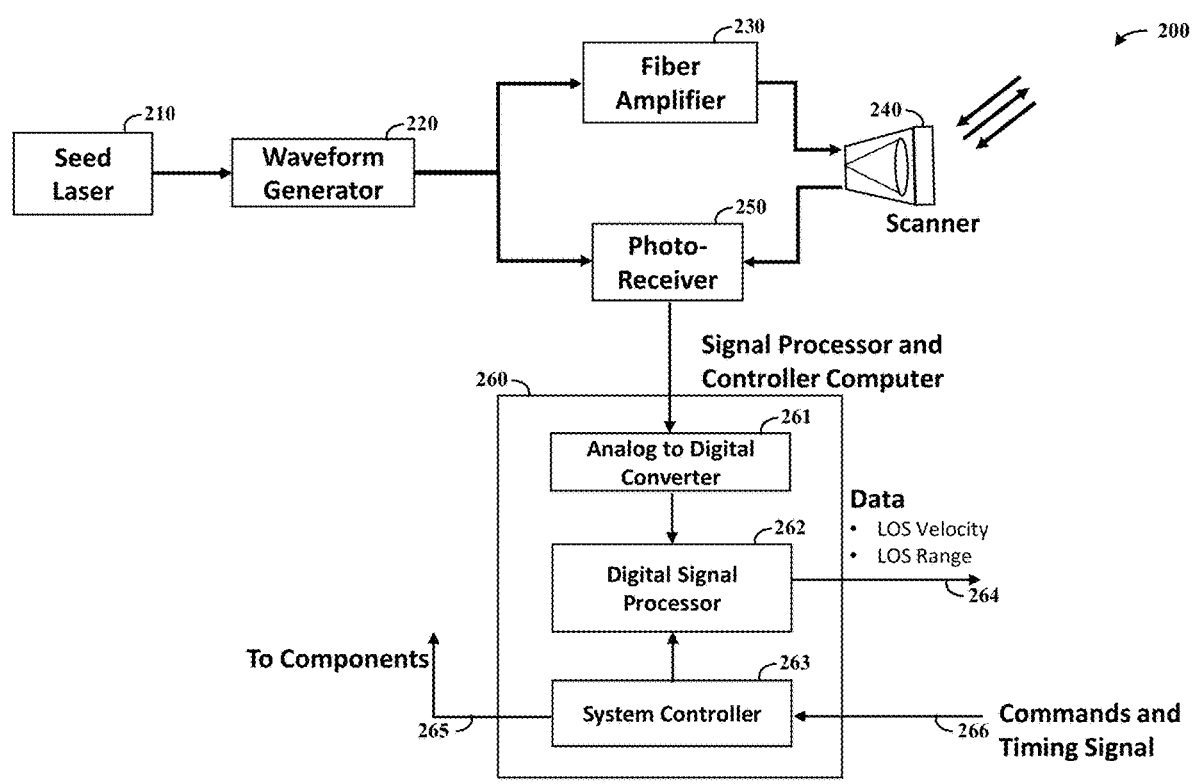
FIG. 2 shows an apparatus for LIDAR-based imaging and motion detection, as may be implemented in connection with one or more embodiments.

FIG. 2 shows an apparatus 200 for LIDAR-based imaging and motion detection, as may be implemented in connection with one or more embodiments. A seed laser 210 generates a seeding laser beam that is fed to a waveform generator 220, which generates a frequency-modulated version of the seeding laser beam, which may be referred to as an oscillator signal. This is provided to a fiber amplifier 230 that amplifies the laser signal, and the amplified laser signal is scanned across a 3D environment by a scanner 240. The oscillator signal is also provided to a photo-receiver 250, which uses the oscillator signal to demodulate reflections of the scanned laser beam received from the scanner 240, to provide an intermediate frequency (IF) laser beam signal to a signal processor and controller 260.

The signal processor and controller 260 includes an analog to digital converter (ADC) 261, digital signal processor (DSP) 262, and system controller (circuitry) 263. The IF laser beam signal is converted to a digital signal by the ADC 261 and processed at the DSP to generate output data 264, which may include (by way of example) velocity and range of respective 3D objects in the scanned environment. These outputs may, for example, be generated based on signal delay and Doppler shift of the reflected laser beam signals, in a manner consistent with that shown in FIG. 1B and otherwise characterized herein. For instance, the time delay can be attributed to distance travelled based on a known or estimated speed through a particular medium, and a rate of change of Doppler frequency shift of respective ones of the reflected signals can be used to ascertain velocity. The system controller 263 operates to control the DSP for providing the velocity and range data 264, and may generate a further output at 265 for utilization by other components (e.g., for automotive use such as autonomous driving). Further, input commands for carrying out operations and providing timing signals can be provided at input 266.

Figure 3:
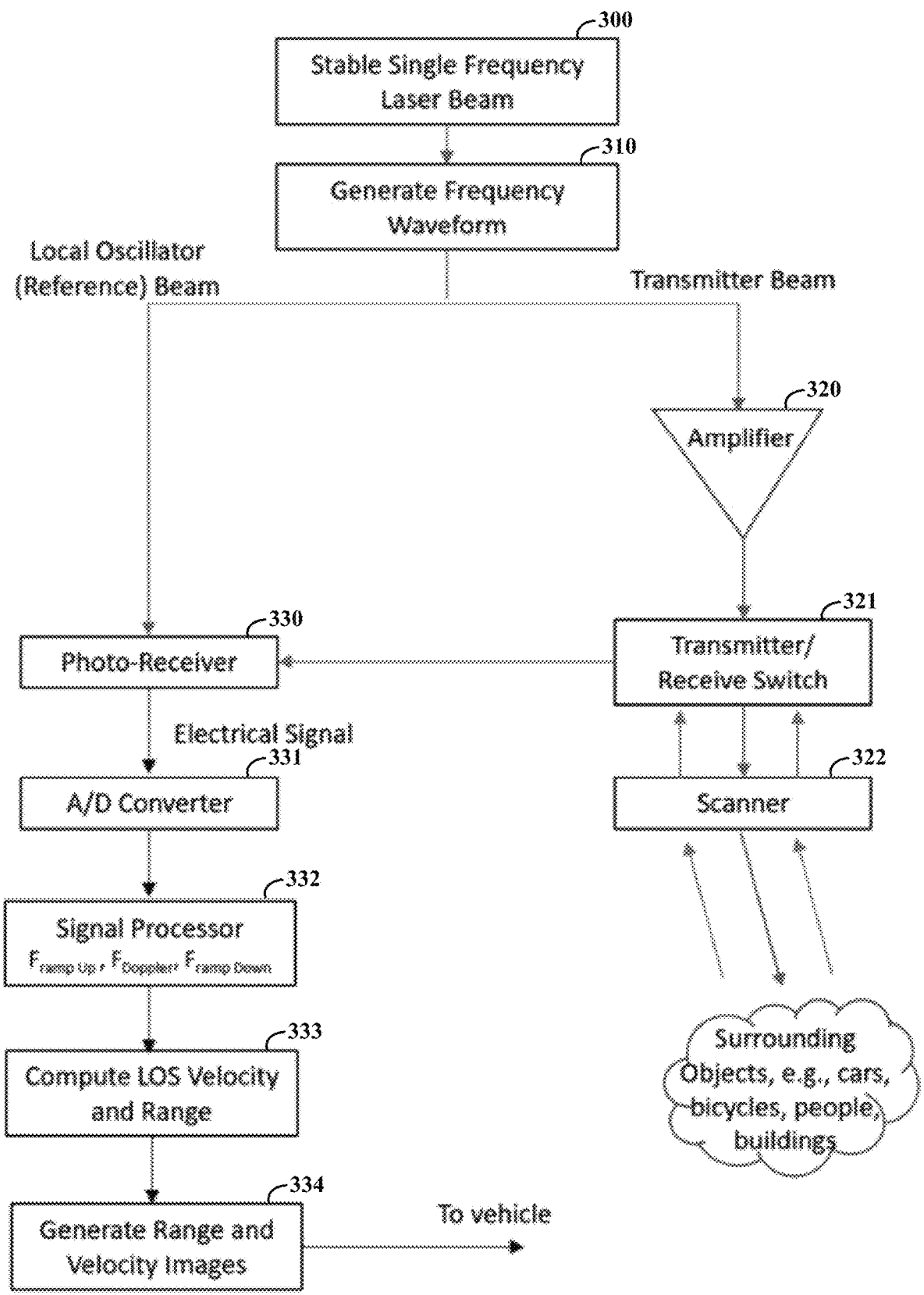
FIG. 3 shows an apparatus and approach for LIDAR-based 3D imaging and velocity estimation, as may be implemented in accordance with one or more embodiments.

FIG. 3 shows an apparatus and approach for LIDAR-based 3D imaging and velocity estimation, as may be implemented in accordance with one of more embodiments. A stable single frequency laser beam is generated at block 300, and a frequency waveform is generated therefrom at block 310. The frequency waveform is provided as a transmitter beam to amplifier 320, and as a local oscillator (reference) beam to photo-receiver 330.

The amplifier 320 amplifies the transmitter beam, which is provided to a scanner 322 via a transmitter/receiver switch 321 and scanned across objects in a surrounding environment. For instance, where used in an automotive application, an environment in which a vehicle resides may include cars, bicycles, people, buildings, road signs, the road itself, trees and vegetation, and more. The scanner 322 thus scans the laser light in the environment and receives reflections of the scanned laser light, which are passed to the photo-receiver 330 via the transmitter/receiver switch 321.

The photo-receiver 330 uses the local oscillator beam to process the received reflected signals, and provides the processed reflected signals to an ADC 331. For instance, the local oscillator beam can be used as a reference signal, relative to the amplified transmitter signal, to demodulate or downconvert the reflections for processing at the ADC. A signal processor 332 detects delays and Doppler shifts in the digital signals, indicating whether the frequency of respective reflections is shifting up or down, providing an indication of velocity, and distance related to time delay of the reflections. At block 333, the Doppler shifts and delay is used to compute LOS velocity and range values, and corresponding range and velocity images are generated at block 334. By accumulating a number of LOS velocity and range data, velocity and range images are generated using the pointing registration of the laser beam as it scans the scene. These values or images can be provided to a vehicle and use in a variety of manners, such as for collision avoidance, speed control, and autonomous driving.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., frequency modulator, C&DH unit, signal processor and controller computer). For example, in certain of the above-discussed embodiments, one or more modules are discrete logic circuits or programmable logic circuits configured and arranged for implementing these operations/activities, as in blocks 150 and 152 of FIG. 1, in the signal processor and controller computer 260 and indicated blocks therein, or in the various blocks shown in FIG. 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, multiple transmitters and photodetectors can be used to scan an environment and ascertain 3D images thereof. Such modifications do not depart from the true spirit and scope of various aspects of the invention, including aspects set forth in the claims.

What is claimed is:

1. An apparatus comprising:
   a laser transmitter configured and arranged to scan objects in a local three-dimensional (3D) environment with laser light generated as a frequency-modulated continuous waveform (FMCW) signal, wherein:
      a first portion of the generated FMCW signal is used to create a reference oscillator signal; and
      a second portion of the generated FMCW signal is scanned across the local environment;
   a laser receiver configured and arranged to:
      receive the first portion of the generated FMCW signal; and
      receive reflections of the scanned second portion of the FMCW signal from the objects; and
   processing circuitry configured and arranged with the laser transmitter and the laser receiver to generate a 3D image of the local 3D environment including the objects using the reflections of the scanned second portion of the generated FMCW signal, wherein:
      a distance of each object relative to the laser transmitter is determined according to a frequency difference due to a time dela between the reference oscillator signal and the received second portion of the FMCW signal; and
      a velocity of each object relative to the laser transmitter is determined according to a frequency difference due to a Doppler shift between a first waveform of the reference oscillator signal and a second waveform of the received second portion of the FMCW signal.

2. The apparatus of claim 1, wherein the processing circuitry is configured and arranged with the laser transmitter and the laser receiver to indicate the velocity of each of the objects.

3. The apparatus of claim 2, wherein the processing circuitry is configured and arranged to indicate a direction and speed of movement of the objects relative to the laser transmitter in the 3D environment based upon the Doppler shift of the reflection from the objects.

4. The apparatus of claim 2, wherein the processing circuitry is configured and arranged to use respective ones of the reflections from the same object to detect velocity of the object in respective positions as the object moves relative to the laser transmitter, and to use the detected velocity in each of the respective positions to indicate a direction of movement of the object and speed of the object along the direction of movement.

5. The apparatus of claim 4, wherein the processing circuitry is configured to determine acceleration or deceleration of the object based upon the speed of the object in each of the respective positions.

6. The apparatus of claim 1, wherein the laser transmitter includes a non-mechanical programmable multi-layered liquid crystal beam steering scanner configured to direct the laser light across a three-dimensional area in the local environment.

7. The apparatus of claim 1, further including a laser source configured and arranged with the laser transmitter to generate the FMCW signal, wherein the processing circuitry is configured to:
   mix the FMCW signal generated by the laser source with the received reflections of the scanned second portion of the generated FMCW signal for providing the distance and relative velocity of the object; and
   generate range and velocity images by combining the distance and relative velocity of the objects as the second portion of the generated FMCW signal scans the local environment, the velocity images indicating velocity using an image characteristic selected from the group of: color, a numerical value, a symbol, and a combination thereof.

8. The apparatus of claim 1, wherein the processing circuitry is configured to process the reflections of the scanned second portion of the generated FMCW signal with the reference oscillator signal.

9. The apparatus of claim 1, wherein the laser receiver is configured to downconvert the frequency of the reflections of the scanned second portion of the generated FMCW signal by mixing the reflections with the oscillator signal.

10. The apparatus of claim 1, wherein the processing circuitry is configured to generate range and velocity images based on the distance and relative velocity measurements of respective ones of the objects as the laser transmitter scans the scene with the second portion of the generated FMCW signal.

11. The apparatus of claim 1, wherein the processing circuitry is configured and arranged to provide the velocity of the object in response to increases or decreases in Doppler shift between the first waveform of the oscillator signal and the second waveform of the received second portion of the FMCW signal of respective ones of the reflections from the 3D object.

12. The apparatus of claim 1, further including:
   a seeding laser source configured and arranged to generate a seeding laser output;
   a waveform generator configured and arranged with the seeding laser source to generate the FMCW signal by modulating the seeding laser output;
   a laser amplifier; and
   a beam splitter configured and arranged with the waveform generator to direct the first portion of the generated FMCW signal to the laser receiver, and the second portion of the generated FMCW signal to the laser amplifier, wherein the laser transmitter is coupled to receive an amplified version of the second portion of the generated FMCW signal output by the laser amplifier, and to scan the objects in the local environment with the amplified version of the the second portion of the generated FMCW signal.

13. A vehicle navigation apparatus comprising:
   a laser source configured to generate a frequency-modulated continuous waveform (FMCW) laser signal, wherein:
      a first portion of the generated FMCW laser signal is used to create a reference oscillator signal; and;
      a second portion of the generated FMCW laser signal is used to scan across a local environment;
   laser transmitter circuitry configured and arranged to:
      amplify the second portion of the generated FMCW laser signal and scan the amplified second portion of the FMCW laser signal across the local environment;
   laser receiver circuitry configured and arranged to:
      receive the first portion of the generated FMCW laser signal from the laser source;
      receive reflections of the scanned second portion of the FMCW laser signal from objects in the local environment; and
      demodulate the received reflections of the second portion of the FMCW laser signal according to the reference oscillator signal to generate an intermediate frequency; and
   imaging circuitry configured and arranged to generate a 3D image of the local environment including the objects, by using the demodulated reflections of the scanned second portion of the FMCW laser signal to depict the objects in their respective locations in the 3D image and to depict velocity of the object relative to the laser transmitter, wherein:
      a distance of each object relative to the laser transmitter is determined according to the intermediate frequency corresponding to a time delay between the reference oscillator signal and the received second portion of the FMCW signal; and
      a velocity of each object relative to the laser transmitter is determined according to the intermediate frequency corresponding to a Doppler shift between a first waveform of the reference oscillator signal and a second waveform of the received reflected second portion of the FMCW signal.

14. A method comprising:
   scanning objects in a local three-dimensional (3D) environment with laser light generated as a frequency-modulated continuous waveform (FMCW) signal, wherein:
      a first portion of the generated FMCW signal is used to create a reference oscillator signal; and
      a second portion of the generated FMCW signal is scanned across the local environment;
   receiving reflections of the scanned laser light from the objects;
   generating a 3D image of the local 3D environment including the objects using the reflections of the scanned second portion of the generated FMCW signal, wherein:
      a distance of each object relative to the laser transmitter is determined according to a frequency difference due to a time dela between the reference oscillator signal and the received second portion of the FMCW signal; and
      a velocity of each object relative to the laser transmitter is determined according to a frequency difference due to a Doppler shift between a first waveform of the oscillator signal and a second waveform of the received second portion of the FMCW signal.

15. The method of claim 14, wherein providing the distance and velocity of the object includes depicting the objects in a position in an image of the local environment and with each object being depicted with an indication of the object's velocity.

16. The method of claim 15, wherein each object is depicted with direction and speed of the object, based upon a frequency shift of the reflection from the object used to generate the image.

17. The method of claim 15, wherein respective ones of the reflections from the same object are utilized to detect velocity of the object in respective positions as the object moves relative to the laser transmitter, and the detected velocity in each of the respective positions is used to indicate a direction of movement of the object and speed of the object along the direction of movement.

18. The method of claim 14, wherein scanning the objects includes using a non-mechanical programmable multi-layered liquid crystal beam steering scanner to direct the laser light across the local environment.

19. The method of claim 14, further including amplifying the second portion of the FMCW signal, wherein scanning the objects includes scanning the objects with the amplified second portion of the FMCW signal, and wherein generating the 3D image includes using the first portion of the FMCW signal, prior to amplification, to demodulate the reflections of the scanned second portion of the FMCW signal.

20. The apparatus of claim 1, wherein the laser receiver is configured to mix the reference oscillator signal and the reflected second portion of the generated FMCW signal to generate an intermediate signal with a frequency equal to a difference between a frequency of the reference oscillator signal and a frequency of the reflected second portion of the generated FMCW signal.

\* \* \* \* \*